Figure 3:
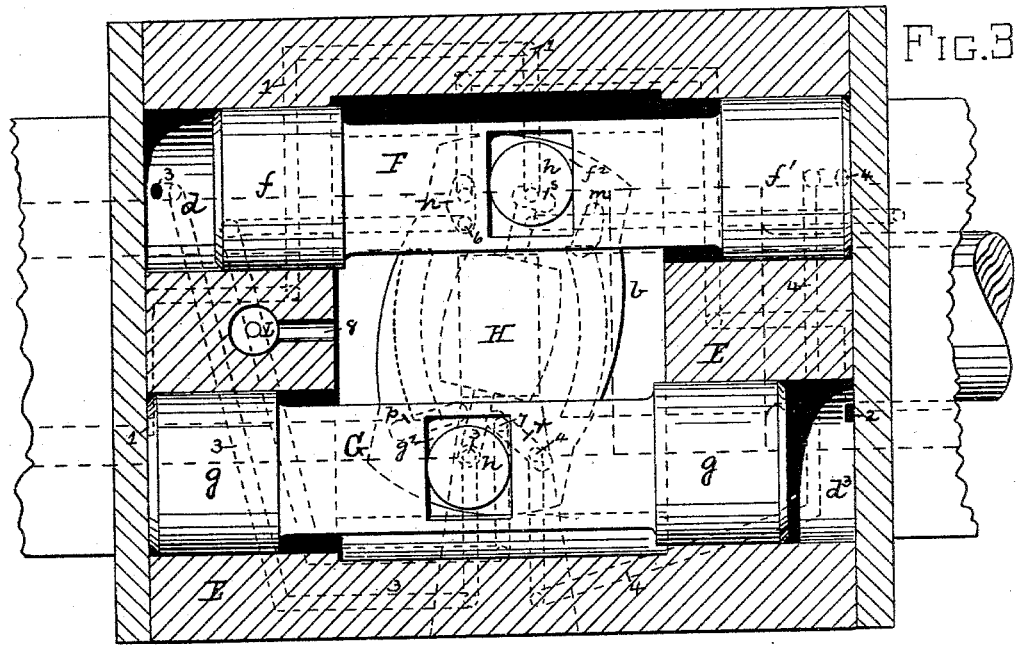

(No Model.) 4 Sheets—Sheet 1.
A. BALL.
VALVE MECHANISM.
No. 584,103. Patented June 8, 1897.
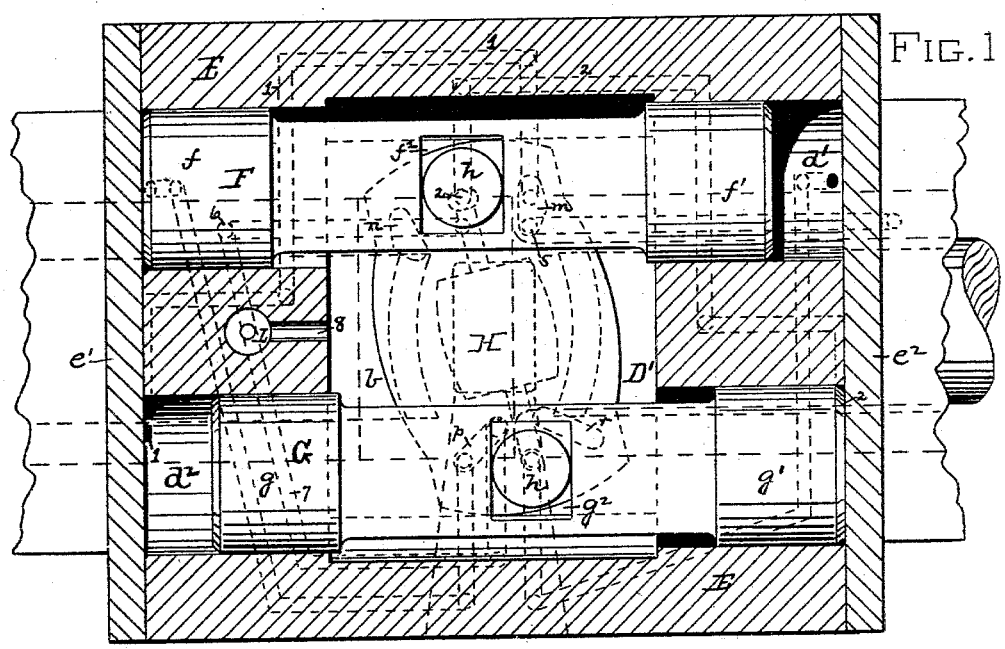
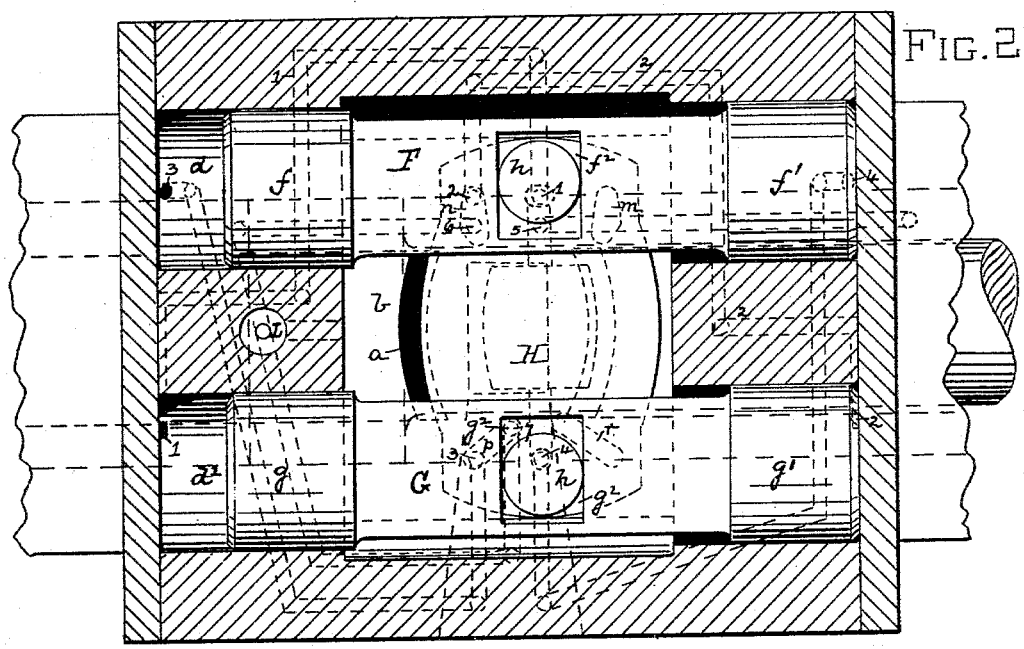
WITNESSES:
Chas. J. Farrar.
Robert C. Totten.
INVENTOR.
Albert Ball
By Kay & Totten
ATTORNEYS.

(No Model.)  4 Sheets—Sheet 2.

A. BALL.
VALVE MECHANISM.

No. 584,103.  Patented June 8, 1897.

WITNESSES:
Chas. J. Farrar.
Robert C. Totten.

INVENTOR.
Albert Ball
By Kay & Totten
ATTORNEYS (No Model.) 4 Sheets—Sheet 3.

A. BALL.
VALVE MECHANISM.

No. 584,103. Patented June 8, 1897.

WITNESSES:
C. J. Farrar.
Robt. C. Totten.

INVENTOR.
Albert Ball
By Kay & Totten
ATTORNEYS.

(No Model.) 4 Sheets—Sheet 4.
A. BALL.
VALVE MECHANISM.
No. 584,103. Patented June 8, 1897.
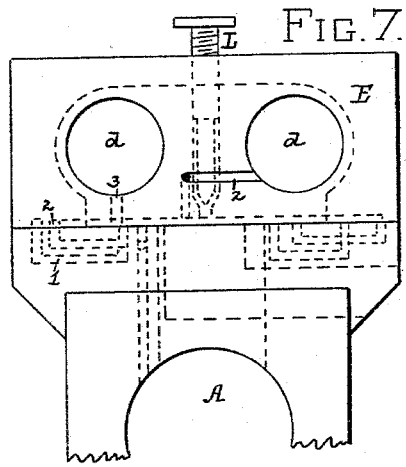
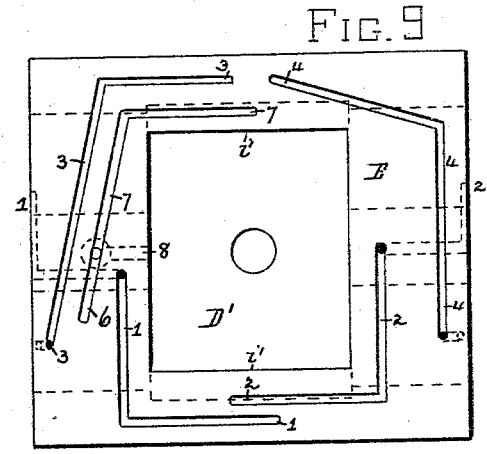
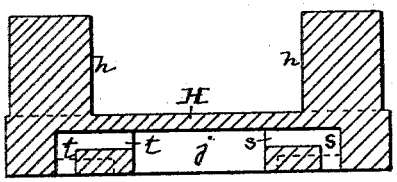
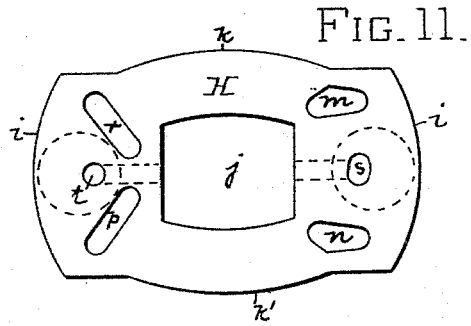
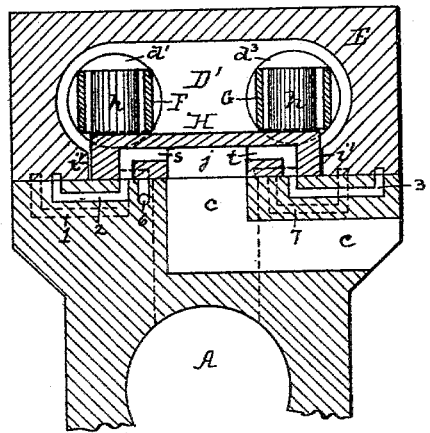
WITNESSES:
C. J. Farrar.
Robt. C. Totten
INVENTOR.
Albert Ball
By Kay & Totten
ATTORNEYS.

United States Patent Office.

ALBERT BALL, OF CLAREMONT, NEW HAMPSHIRE, ASSIGNOR TO THE SULLIVAN MACHINERY COMPANY, OF SAME PLACE.

VALVE MECHANISM.

SPECIFICATION forming part of Letters Patent No. 584,103, dated June 8, 1897.

Application filed August 17, 1895. Serial No. 559,603. (No model.)

*To all whom it may concern:*

Be it known that I, ALBERT BALL, a resident of Claremont, in the county of Sullivan and State of New Hampshire, have invented a new and useful Improvement in Valve Mechanism; and I do hereby declare the following to be a full, clear, and exact description thereof.

My invention relates to reciprocating engines and valve mechanism therefor, its object being to produce an engine which will act, outside of any mechanical connections between the piston and valve-gear, to operate the valve mechanism in such manner as to control the stroke of the engine both as to the speed of the stroke and the cushioning of the piston, so that in the class of engines known as "pick" engines, employed with coal-cutters, stone or rock boring, drilling, or channeling machines, the piston can be cushioned even though the pick or bit does not strike the coal or other material mined or cut, and all danger of knocking out the cylinder-head is prevented, while means for properly throttling the steam controlling the valves is obtained and the stroke of the engine can thereby be regulated.

My invention has for the further object the provision of such valve mechanism to control the regular cylinder-ports and exhaust-port to provide for such cushioning of the piston in the main cylinder.

In the engine herein described I employ, in combination with the reciprocating engine having ports leading from the ends of the main cylinder to a valve-seat and an exhaust-valve port between them, a valve-chest containing a reversing-valve controlling said ports and reciprocating auxiliary pistons connected to the sides of the reversing-valve and operating the same, the reversing-valve also controlling the inlet and exhaust ports from the cylinders for said pistons.

The particular points of construction desired to be covered will be hereinafter more fully set forth and claimed.

To enable others skilled in the art to make and use my invention, I will describe the same, referring to the accompanying drawings, in which—

Figure 4:
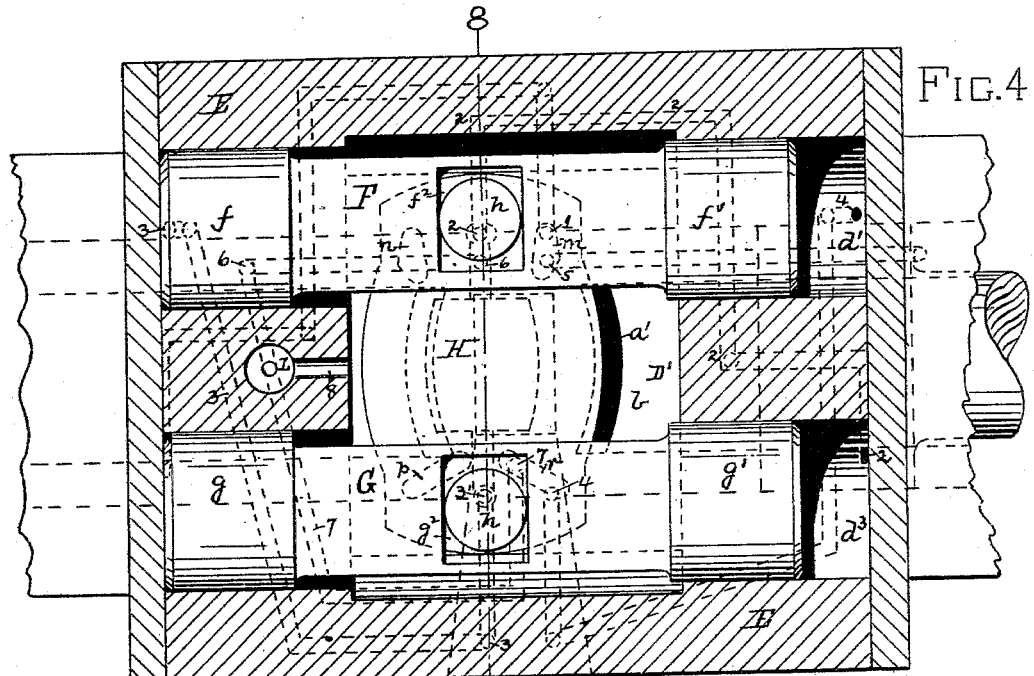
Figure 5:
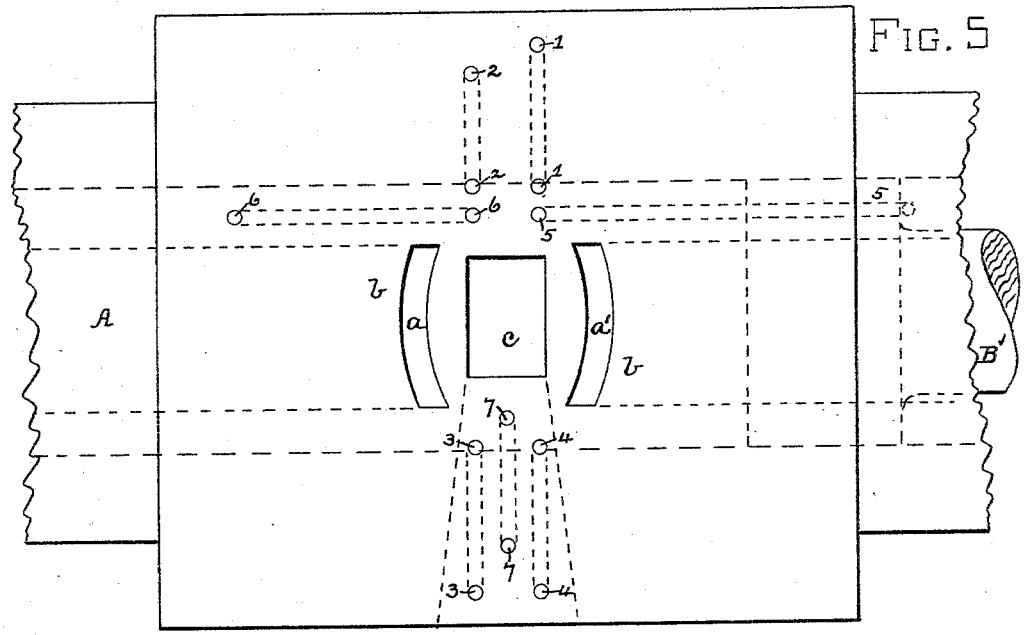
Figure 6:
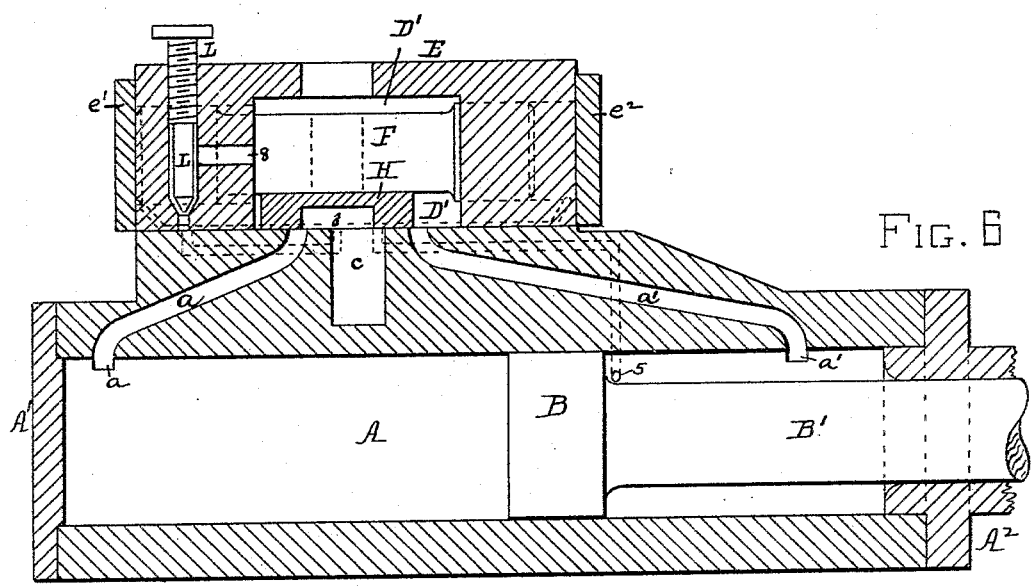

Figures 1, 2, 3, and 4 are horizontal sections centrally through the steam-chest, showing the valves within the steam-chest in full lines and showing different positions of the valve mechanism. Fig. 5 is a plan view of the valve-chest seat, the valve-chest being removed. Fig. 6 is a longitudinal central section, on a smaller scale, through the valve-chest and main cylinder. Fig. 7 is an end view of the steam-chest and part of the cylinder, the cylinder-heads being removed. Fig. 8 is a cross-section through the valve-chest and part of the cylinder on the line 8 8, Fig. 6. Fig. 9 is a bottom view of the valve-chest. Fig. 10 is a longitudinal section of the reversing-valve, and Fig. 11 is a bottom view thereof.

Like letters and numerals of reference indicate like parts in each of the figures.

I will first describe the main parts of the apparatus, following that with a description of the valves and ports, and then will describe the operation of the engine.

The main cylinder A has the cylinder-heads $A'$ $A^2$, in which the piston B is mounted within the cylinder, its piston-rod $B'$ passing out through the cylinder-head $A^2$. Leading from the front and rear ends of the cylinder are the cylinder-ports $a$ $a'$, which lead to the main valve-seat $b$, and between the mouths of said ports in said valve-seat is the exhaust-port $c$. The dimensions of these ports are shown in the drawings, it being preferred to form the mouths of the main ports $a$ $a$ in the valve-seat $b$ of curved shape, as illustrated in the different views, so that they may be covered and uncovered by the reversing-valve H, as hereinafter described. The course of the exhaust-port $c$ is shown by dotted lines in Fig. 7 and in full lines in Fig. 8. The valve-chest E extends over the valve-chest seat $b$, which is formed with the main cylinder, these two main castings composing the body of the engine. At the ends of the valve-chest E are the head or end plates $e'$ $e^2$, which extend over the auxiliary piston-cylinders $d$ $d'$ $d^2$ $d^3$. At each end of the auxiliary chest are formed two valve-piston cylinders or guideways $d$ $d'$ $d^2$ $d^3$, the guideways $d$ $d'$ receiving the piston-heads $f$ $f'$ of the auxiliary piston F on one side of the valve-chest and the cylinders or guideways $d^2$ $d^3$ receiving the piston-heads $g\ g'$ of the reciprocating auxiliary piston G on the other side of the valve-chest, the said guideways opening inwardly into the central valve-chamber D'. Each of these reciprocating pistons F G thus practically forms one set with two piston-heads connected by a stem or body so that they reciprocate together in their cylinders or guideways, the inner portions of the piston-heads being exposed to the steam within the central valve-chamber D'.

Extending centrally and transversely of the valve connections or stems $f'\ g'$ are the slots $f^2\ g^2$, within which fit the trunnions $h$ of the reversing-valve H, which perform the functions of the main valve controlling the supply and exhaust ports to the main cylinder and also of controlling the movement of the reciprocating auxiliary pistons F G, which in turn operate the reversing or main valve H. In the construction shown this main valve H has the curved end portions $i$, which are formed as radii from the center of the valve and which curved end portions $i$ fit between the longitudinally-extending guides $i'$, (more clearly shown in Fig. 8,) such guides or ribs extending for the full length of the central valve-chamber D' and acting to prevent side movement of the valve H; and I also prefer to form the side faces $k\ k'$ of the valve H curved, as shown, corresponding to the curved mouth of the main cylinder-ports $a\ a'$, such portions of the main valve H acting to cover and uncover said main cylinder-ports. Within the center of the valve H is the exhaust-cavity $j$, the side faces of which are curved corresponding to the inner edges of the main cylinder-ports $a\ a'$, said cavity forming communication between said ports $a\ a'$ and the main exhaust-port $c$ of the engine.

It is to be seen that the main valve H is exposed directly to the pressure of the steam within the steam-chest, which will hold it upon its seat $b'$, but in addition to this the stems or bodies of the auxiliary pistons F G act also to hold the valve upon the seat. For this reason I prefer to employ the construction of pistons illustrated, the stems and piston-heads being formed in one piece, but it is to be understood that said piston-heads may be connected in any desired way, so long as they move together and carry with them the reversing-valve in the course above indicated and permit of the swinging or oscillating movement thereof, which is accomplished in the apparatus shown by the transverse slots $f^2\ g^2$, which are of sufficient length to permit sufficient side movement of the trunnions $h$ $h'$ to enable the main valve to assume substantially the positions indicated. Any suitable loose connection for this purpose may be employed. The general movements of these parts are shown in Figs. 1, 2, 3, and 4. When both auxiliary pistons are at one end of the valve-chest, one of the cylinder-ports, such as the port $a'$, is uncovered, as shown in Fig. 4, communication between the other port $a$ and the exhaust-port $c$ being formed by the cavity $j$. When the auxiliary piston G is moved to the opposite end of the stroke, the main valve H is swung or oscillated, so as to close both cylinder-ports $a\ a'$, cutting off the steam-supply on one side of the main piston B and by closing the other port acting to cushion the main piston on the other side thereof. This position is momentary, though sufficient to cushion the main piston, after which the other auxiliary piston F is moved to the opposite end of the steam-chest, bringing the parts to the position shown in Fig. 2, uncovering the cylinder-port $a$ and forming communication between the cylinder-port $a$ and the exhaust-port $c$. The auxiliary piston G then moves back to its original position, oscillating the main valve and throwing it into diagonal position, as shown in Fig. 3, and acting to cut off the steam-supply and to cushion the main piston at the opposite end of the cylinder. The other auxiliary piston F then moves to its original position, bringing the ports back to the position shown in Fig. 4 and opening the port $a'$ to the steam-piston and forming communication between the cylinder-port $a$ and the exhaust-port $c$. These might be termed in general the "movements" of the valves, and it is desired to cover, broadly, valve mechanism having these movements—$i.\ e.$, the half-way stop over the main cylinder-ports to provide for cushioning and the subsequent movement to complete its stroke—as such movements are believed to be entirely new in any system of ports, and any means to produce such movements may be employed.

To obtain the movements of the different auxiliary pistons, I prefer to employ a system of ports, &c., which I will now describe. To simplify the description, I will refer to the passages as "ports," even though they are of considerable length, and will mark them with the same reference-characters throughout their length. Extending up from the main cylinder-chamber is the port 5, which leads through the main casting in the course indicated up through the main valve-seat $b$ at one side of the exhaust-port $c$. This supplies steam for moving the auxiliary piston G, and steam is carried to the end of cylinder $d^2$ from said port by means of the port 1, which, as shown, passes first down into the main casting and thence close to the side of said casting, being drilled through such casting, the ends of the drilled openings being plugged. The port is then formed by channeling along the under surface of the steam-chest, as shown in Fig. 9, when it is then carried by drilling through the body of the steam-chest casting to the outer face thereof, as shown in Fig. 7, whence it extends along the said outer face into the valve-cylinder $d^2$. This inlet-port, which controls the backward movement of the main piston and the operation of the slide-valves for that purpose, is preferably arranged as shown, because it is preferred that the backward movement of the main piston should always be the same. The steam-inlets to the other parts are controlled by the throttle-valve L, which extends down through the top of the valve-chest into the throttle-valve chamber 9, which receives steam from the central valve-chamber D' through the port 8, the steam passing thence to the throttle-valve and passing from the same in two directions, one by the port 6, which opens, as shown, in the valve-seat b on the same side thereof as the port 5, and one by the port 7, passing to the opposite side of the valve-seat. This port 6 extends, as indicated in dotted lines in Figs. 1 to 4, under the auxiliary piston-cylinder d, and thence, as more clearly shown in dotted lines in Fig. 5, longitudinally of the main casting to the point that it opens through the valve-seat, as above stated. The port 7 leads in the opposite direction from the throttle-valve L to the opposite side of the valve-chest, and thence leads inwardly, opening centrally of and at one side of the exhaust-port c. These ports 6 and 7 are formed by channeling and drilling through the castings, as indicated in the drawings, and their course is more clearly shown by comparing Figs. 5 and 8.

To form communication with the outer end of the auxiliary piston-cylinder $d^3$, I employ the port 2, which, as shown, opens through the valve-seat b on the same side of the exhaust-port as the port 1 and in line with the opening in the steam-port 6. It thence extends by drilling, as shown by Fig. 5, and thence rises through and communicates with the channel indicated in Fig. 9, whence it is carried, in the same way as the port 1, by drilling through the valve-chest and channeling along the end face thereof to the end of the auxiliary piston-cylinder $d^3$. Steam is carried to and from the auxiliary piston-cylinders d d' by the ports 3 and 4, which ports open through the valve-seat b, one on each side of the steam-inlet port 7, but a greater distance from the exhaust-port c. The port 3 leads through the main casting, as indicated in Fig. 5, and thence rises and is formed as a channel in the under face of the valve-chest over to a point under the auxiliary piston-cylinder d, whence it is carried by drilling into the base of the same near the outer end. The port 4 is carried in the same way, first by drilling through the main casting, thence by the channel on the lower face of the valve-chest, and thence by drilling into the auxiliary piston-cylinder d'. These several ports are all controlled by cavities or ports in the main valve H, which I will now describe. For that purpose the valve has the cavity or bridge m, which forms communication between the ports 5 and 1, and at the opposite side thereof the cavity n, which forms communication between the port 6 and the port 2. At the opposite end of the valve it has the port p, which forms communication between the steam-supply port 7 and the port 3, and the port r, which forms communication between the steam-supply port 7 and the port 4. The steam is exhausted from these several ports leading to the auxiliary piston-cylinders as follows: Extending up into the body of the valve H near one end is the port s, which leads thence into the main exhaust-cavity j of the valve, and extending up into the valve at the other end thereof is the port t, which leads thence horizontally into the exhaust-cavity j. It is to be understood that where necessary these ports are drilled through the castings and the ends of the ports made are plugged, it being found that the several ports can thus be constructed at small cost and that necessity for a separate port-plate between the valve-chest and the main cylinder is overcome.

In the operation of the engine with the ports arranged as above described let it be supposed that both auxiliary pistons F G are in the position shown in Fig. 4. Steam then passes down through the cylinder-port a' to the main cylinder, forcing the piston B to the rear end thereof, and as the piston moves in its course it uncovers the port 5, the main valve H being in such position that the bridge or cavity forms communication between the port 5 and the port 1 while the port 3 is in communication with the exhaust-port s in the main valve. The steam then passes up through that port 5, through the cavity m in the main valve H, and through the port 1 to the auxiliary piston-cylinder $d^2$, forcing the auxiliary piston G forward into the position shown in Fig. 1. This performs two functions. First it carries the main valve H over the cylinder-port a', closing the same and cutting off the steam, and also carries the exhaust-port away from the cylinder-port a, closing that port and thereby cushioning the main piston B at the rear end of the cylinder A. The main valve therefore has what might be termed a "half-way" stop in its travel, which acts to cushion the main piston, this being, so far as I know, entirely new. Such movement of the main valve causes the cavity p thereof to form communication between the supply-port 7 and the port 3, so that steam passes to the auxiliary piston-cylinder d and at the same time brings the exhaust-port t into communication with the port 4, so exhausting the steam from the auxiliary piston-cylinder d', and the auxiliary piston F then moves forward into the position shown in Fig. 2. Such movement uncovers the port a and forms communication between the port a' and the exhaust-port c, so that the main piston is forced forward within the main cylinder. Said movement also causes the cavity n to form communication between the supply-port 6 and the port 2 and brings the exhaust-port s over the port 1, permitting steam to pass to the auxiliary piston-cylinder $d^3$ and be exhausted from the auxiliary piston-cylinder $d^2$. The steam passing in this course is throttled by the valve L, so that the movement of the auxiliary piston G is regulated according to the desired stroke of the piston, and the speed of its movement is therefore regulated as desired, the main valve H being slowly moved by the auxiliary piston G into the position shown in Fig. 3, which gives the half-way stop above described, cuts off the steam-supply, and cushions the main piston in its forward movement. As soon as the auxiliary piston G is carried to its rear position, as shown in Fig. 3, the valve H opens by the cavity r between the steam-supply port 7 and the port 4 and brings the exhaust-port t over the port 2, so feeding steam to the auxiliary piston-cylinder d' and exhausting it from the auxiliary piston-cylinder d, and causing the backward movement of the auxiliary piston F, carrying it to the position shown in Fig. 4, after which the above movements are repeated. It will be seen that the throttle-valve L controls the supply of steam to all the supply-valve ports except the valve-port 5, and it therefore controls the movement of the auxiliary piston F in both directions, and the movement of the auxiliary piston G in one direction, the main piston controlling the movement of the auxiliary piston in the opposite direction, which occurs in the backward movement of the main piston. This is preferred because it gives perfect control of the forward movement of the main piston according to the opening or throttling of the steam to the reciprocating pistons, but provides the backward movement of the main piston always at the same speed, which is desirable, as it gives a quick return thereof and yet permits the perfect control of the forward stroke of the piston. If desired, however, the port 5 may also receive steam from the throttle-valve, which could be accomplished by causing communication between the port 6 and the port 5 and closing communication between the port 5 and the main cylinder.

The apparatus is simple in construction, and the single main valve H controls not only the supply and exhaust ports to the main cylinder but to all the auxiliary cylinders, so very much simplifying the construction of this class of engines. The mechanism can also be constructed at comparatively small cost, as but two main castings are required, and all the ports controlling the auxiliary pistons can be formed to exact shape and size by drilling or channeling.

What I claim as my invention, and desire to secure by Letters Patent, is—

1. The combination with a reciprocating engine having ports leading from the ends of the main cylinder, and an exhaust-port between them, of a swinging slide-valve controlling said ports, and mechanism for swinging said slide-valve into position to cut off steam and cushion the main piston, substantially as set forth.

2. The combination with a reciprocating engine having ports leading from the ends of the main cylinder and an exhaust-port between them, of a valve-chest containing a slide-valve controlling said ports, and independent reciprocating pistons connected to each side of said slide-valve to operate the same, substantially as set forth.

3. The combination with a reciprocating engine, a valve-chest containing a swinging slide-valve, reciprocating pistons connected to each side of said slide-valve, each of said pistons being formed of a stem and piston-heads rigid with each other, substantially as set forth.

4. The combination with a reciprocating engine, of a valve-chest containing a swinging slide-valve having trunnions extending up therefrom and reciprocating pistons, each formed of a stem and piston-heads rigid with each other, the stems having transverse slots fitting over the trunnions of the slide-valve, substantially as set forth.

5. The combination with a reciprocating engine, of a valve-chest having longitudinal guides at the sides thereof, and a swinging slide-valve having curved ends fitting between the said guides, substantially as set forth.

6. The combination with a reciprocating engine, of a valve-chest having longitudinal guides at the sides thereof, a swinging slide-valve having curved ends fitting between the said guides, and reciprocating pistons connected to the sides of the slide-valve, substantially as set forth.

7. The combination with a reciprocating engine provided with ports leading from the ends thereof having curved mouths in the slide-valve seat, of a swinging slide-valve moving over the same, and reciprocating pistons connected to the sides of the slide-valve, substantially as set forth.

8. The combination with a reciprocating engine having ports leading from the ends of the main cylinder to the valve-seat and an exhaust-port between them of a valve-chest having cylinders and reciprocating pistons mounted in said cylinders, ports leading from said valve-seat to the said cylinders, and a swinging slide-valve connected to the reciprocating pistons and controlling the engine-ports, and also controlling the ports to the said cylinders, substantially as set forth.

9. The combination with a reciprocating engine having ports leading from the ends thereof to a valve-seat and an exhaust-port between them, of a valve-chest having cylinders and reciprocating pistons mounted in said cylinders, a throttle-valve controlling a supply-port leading from the valve-chest to the valve-seat and valve-ports leading from said valve-seat to the said cylinders, and a main slide-valve controlling the engine-ports and the ports leading to the said cylinders, substantially as set forth.

10. The combination with a reciprocating engine of a valve-chest having cylinders, reciprocating pistons mounted in said cylinders, ports leading from the slide-valve seat to the said cylinders, a throttle-valve controlling supply-ports from the valve-chest to each side of a slide-valve seat, and a slide-valve connected to the reciprocating pistons and controlling the connections between said supply-ports and the said cylinders, substantially as set forth.

11. The combination of a reciprocating engine, having ports leading therefrom to a slide-valve seat, and an exhaust-port between them, of a valve-chest having cylinders therein, reciprocating pistons in said cylinders, and ports leading from a slide-valve seat to the ends of said cylinders, a slide-valve moving over said seat and controlling the main engine-ports, and having a central exhaust-cavity and ports passing through the slide-valve and communicating with the central exhaust-cavity and adapted in its movement to form communication between the said cylinder-ports and said exhaust-cavity, substantially as set forth.

12. The combination with a reciprocating engine having the ports $a$ and $a'$ and exhaust-port $c$ in the slide-valve seat, a valve-chest having cylinders $d\ d'\ d^2\ d^3$, the pistons F, G mounted therein, and ports leading from the slide-valve seat to the said cylinders and the slide-valve H having the central exhaust-cavity $j$ and having the passages or cavities $m, n, r$ and $p$ in its face controlling communication between the supply-ports and the said cylinder-ports, substantially as set forth.

13. The combination with a reciprocating engine having the ports $a$ and $a'$ and exhaust-port $c$ in the slide-valve seat, a valve-chest having cylinders $d, d'\ d^2\ d^3$, the pistons F, G mounted therein, and ports leading from the slide-valve seat to the said cylinders, and the slide-valve H having the central exhaust-cavity $j$ and having the passages or cavities $m, n, r$ and $p$ in its face controlling communication between the supply-ports and the said cylinder-ports, and having the exhaust-ports $s, t$ extending up therein and communicating with the central exhaust-cavity $j$ and controlling the exhaust from the said cylinder-ports, substantially as set forth.

14. The combination of a reciprocating engine having a slide-valve seat, a valve-chest having cylinders therein and ports leading from the slide-valve seat to the said cylinders, the supply-port 5 leading from the main cylinder to said valve-seat, supply-ports 6 and 7 leading from the valve-chest to the said slide-valve seat, and the slide-valve H having cavities in its face controlling communication between said supply-ports and the said cylinders, substantially as set forth.

15. The combination of a reciprocating engine, a slide-valve seat, a valve-chest having cylinders therein and ports leading from the slide-valve seat to the cylinders, the supply-port 5 leading from the main engine-cylinder to said slide-valve seat, supply-ports 6 and 7 leading from the valve-chest to the said slide-valve seat, the throttle-valve L controlling the supply-ports 6 and 7 leading to the valve-chest, the slide-valve H having cavities in its face controlling communication between said supply-ports and the auxiliary cylinder, substantially as set forth.

In testimony whereof I, the said ALBERT BALL, have hereunto set my hand.

ALBERT BALL.

Witnesses:
FRANK A. BALL,
H. H. MERCER.